Feb. 23, 1965 O. E. WERNER 3,170,541
FOOD VENDING ASSEMBLY
Filed Dec. 18, 1961 9 Sheets-Sheet 1
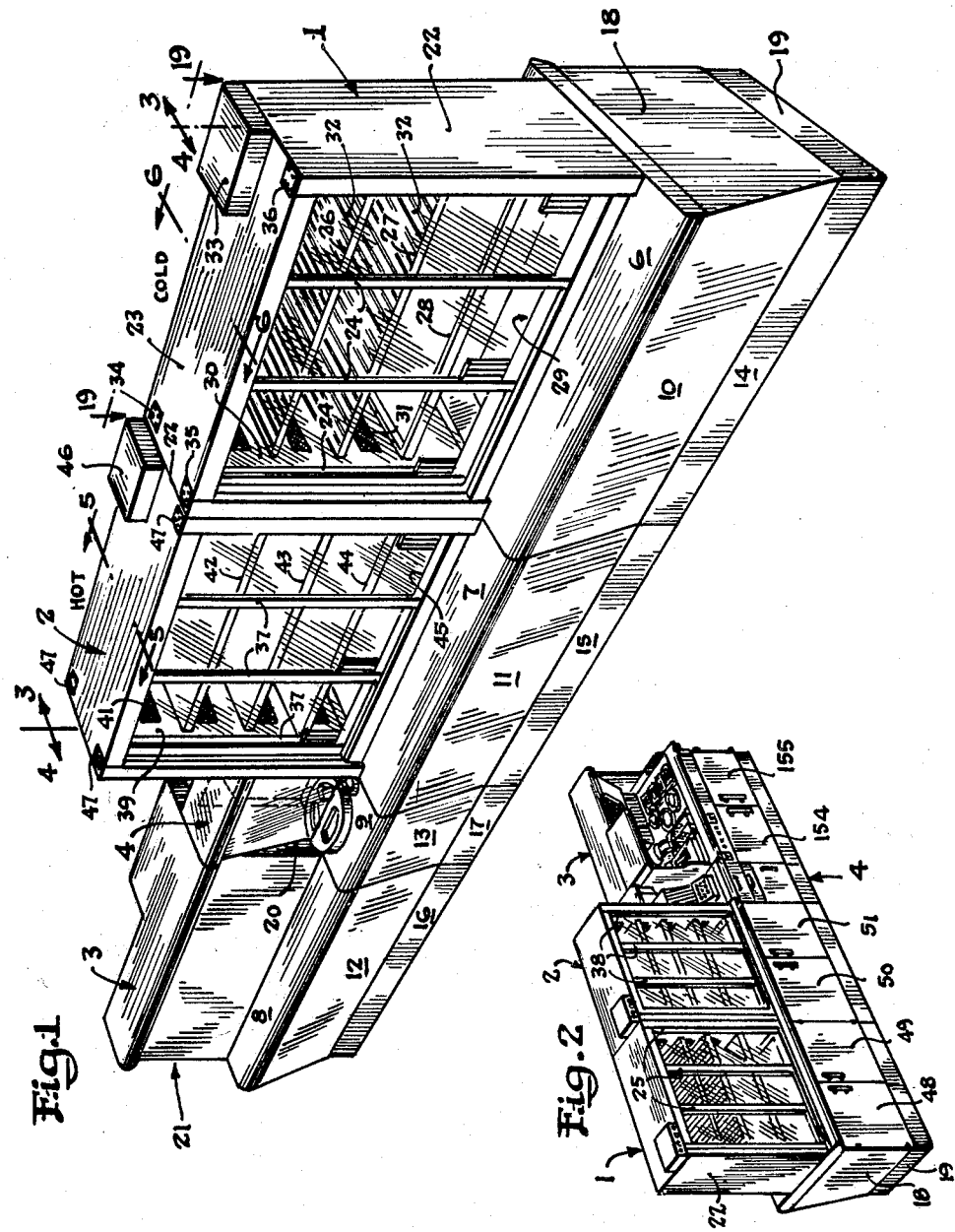
INVENTOR:
OTTO E. WERNER
BY 
ATT'YS.

Feb. 23, 1965     O. E. WERNER     3,170,541
FOOD VENDING ASSEMBLY
Filed Dec. 18, 1961     9 Sheets-Sheet 2

INVENTOR:
OTTO E. WERNER
BY
ATTYS.

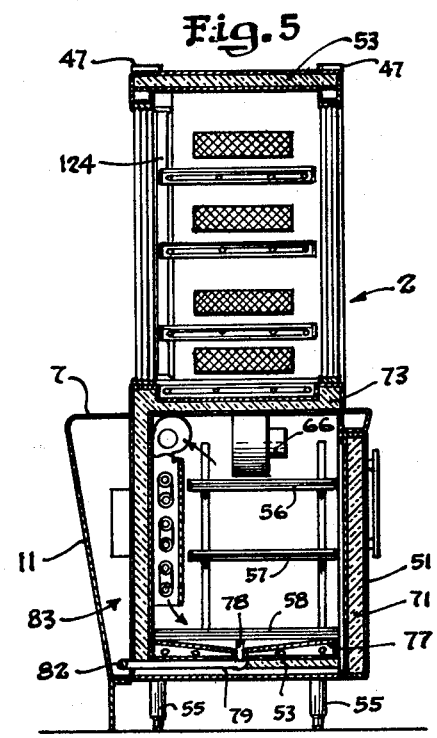
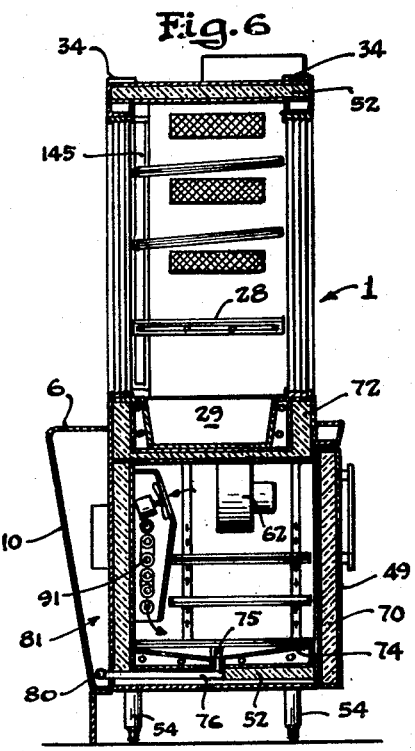
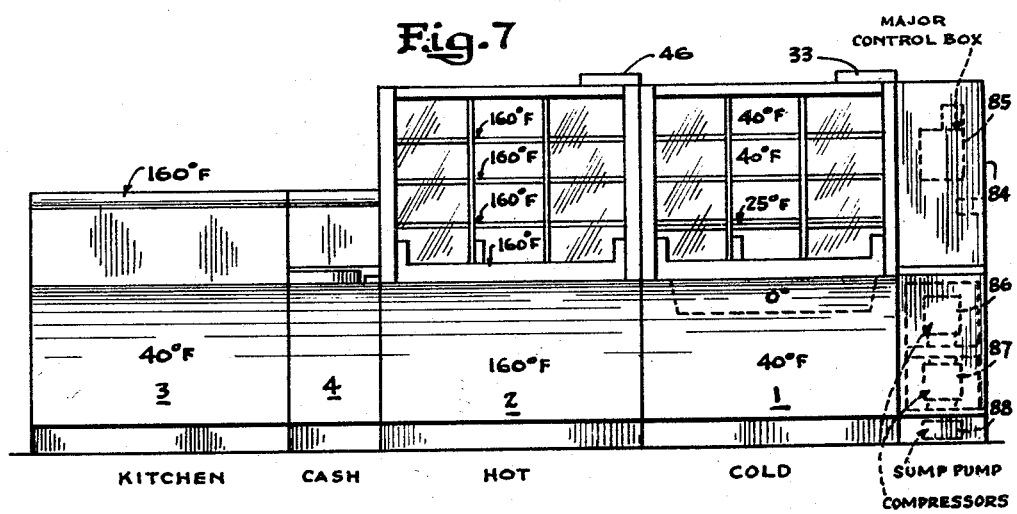

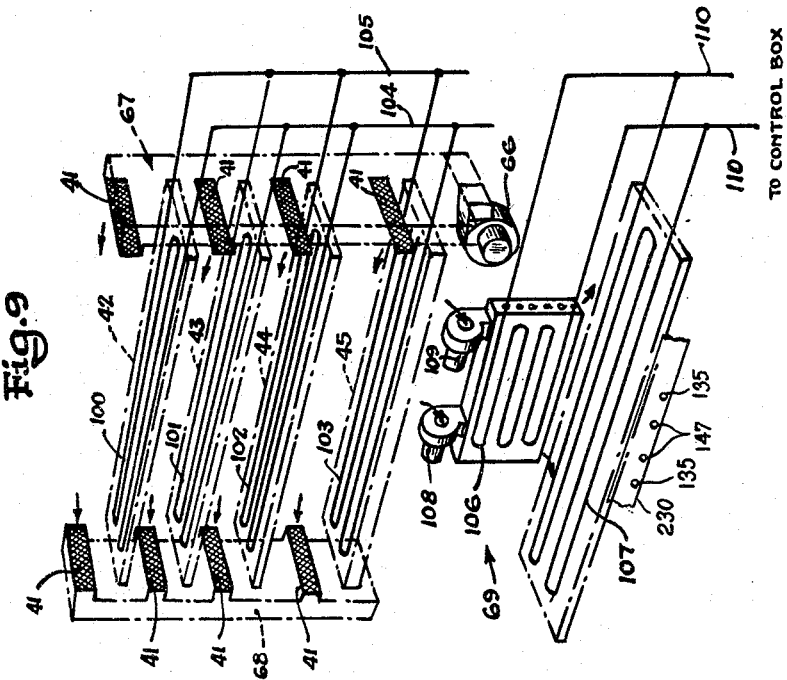
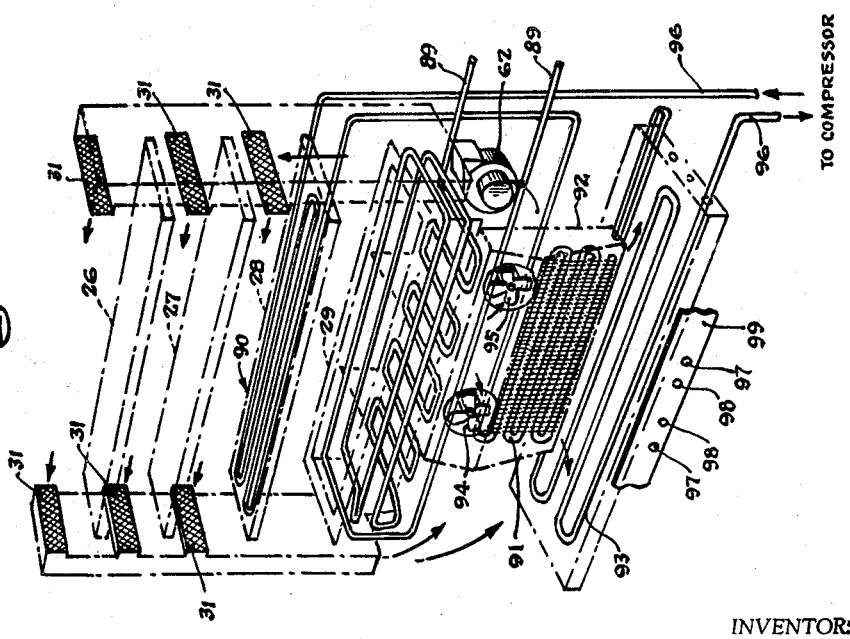

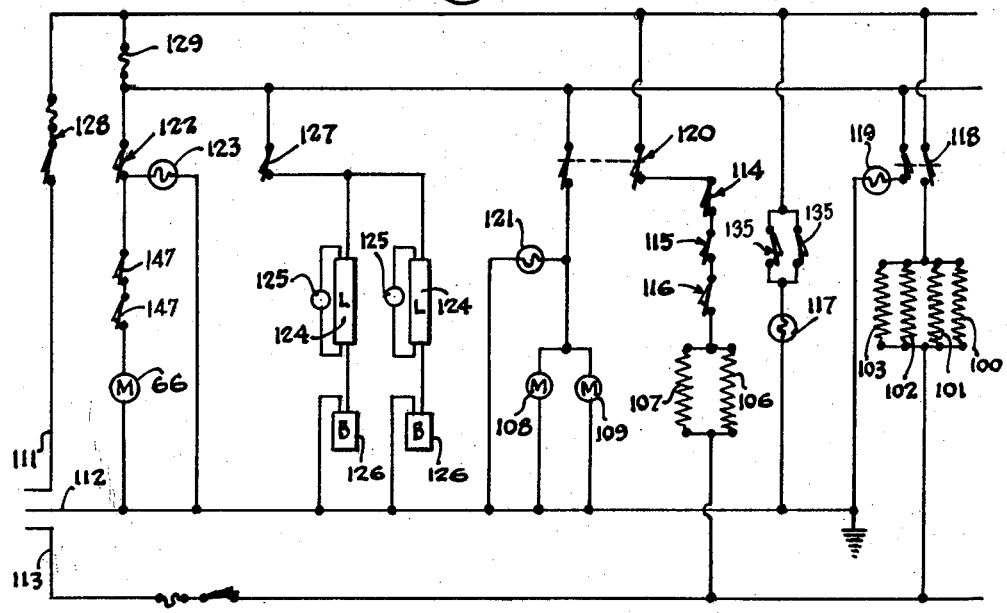
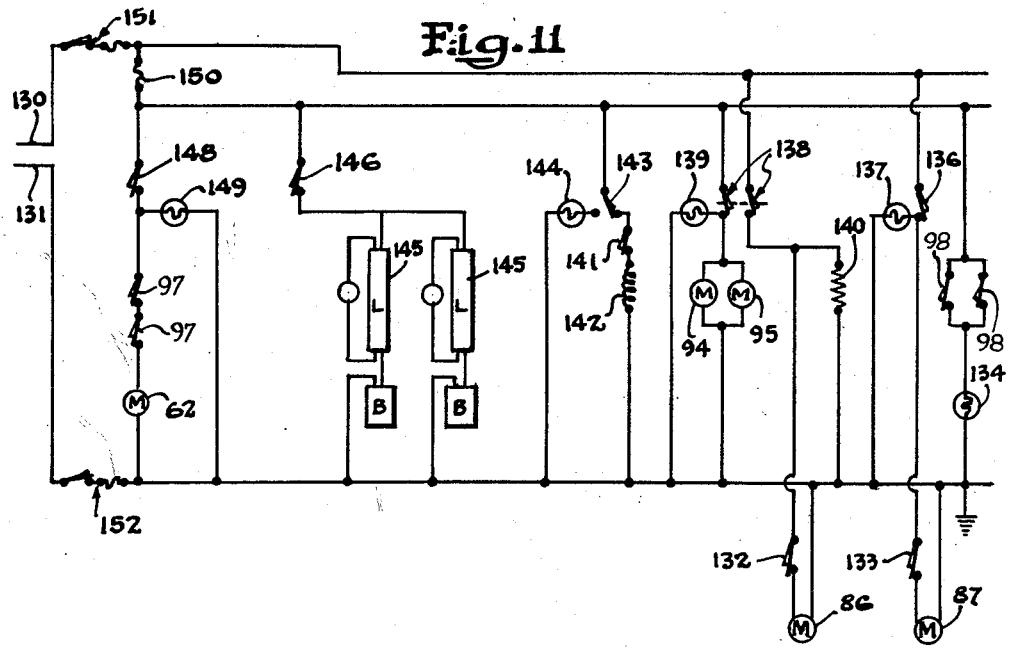

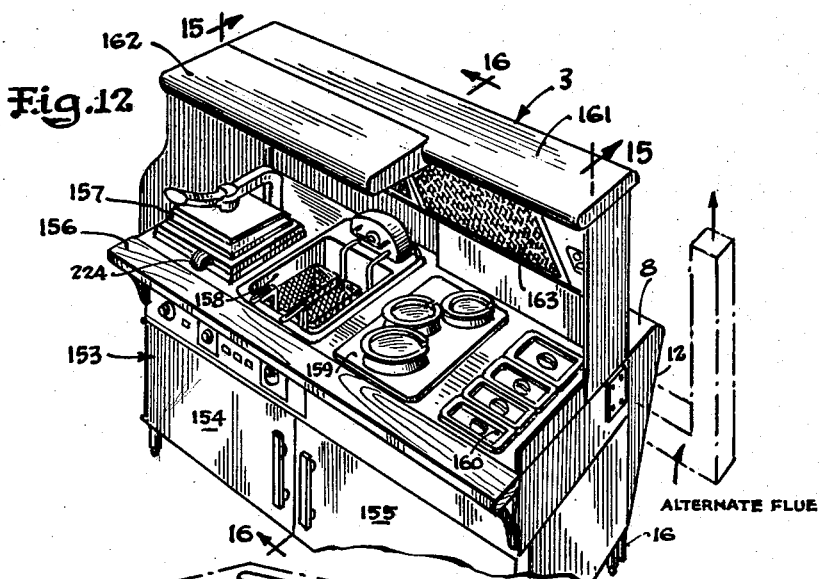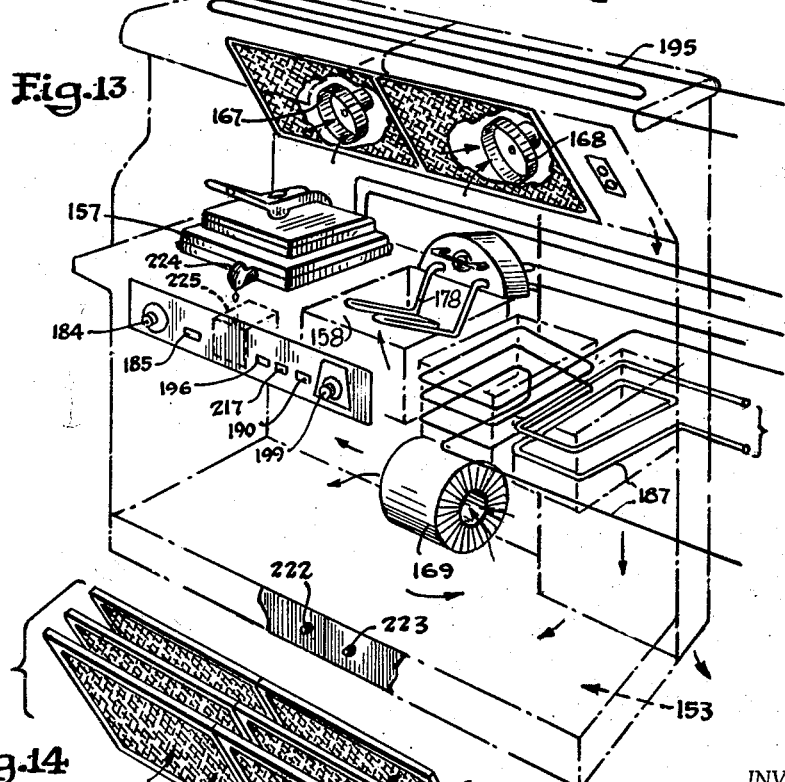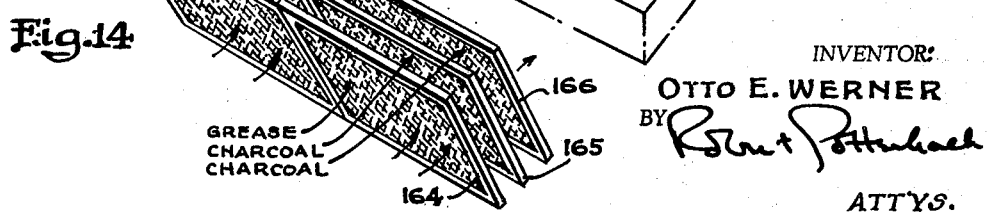

Feb. 23, 1965   O. E. WERNER   3,170,541
FOOD VENDING ASSEMBLY
Filed Dec. 18, 1961   9 Sheets-Sheet 7
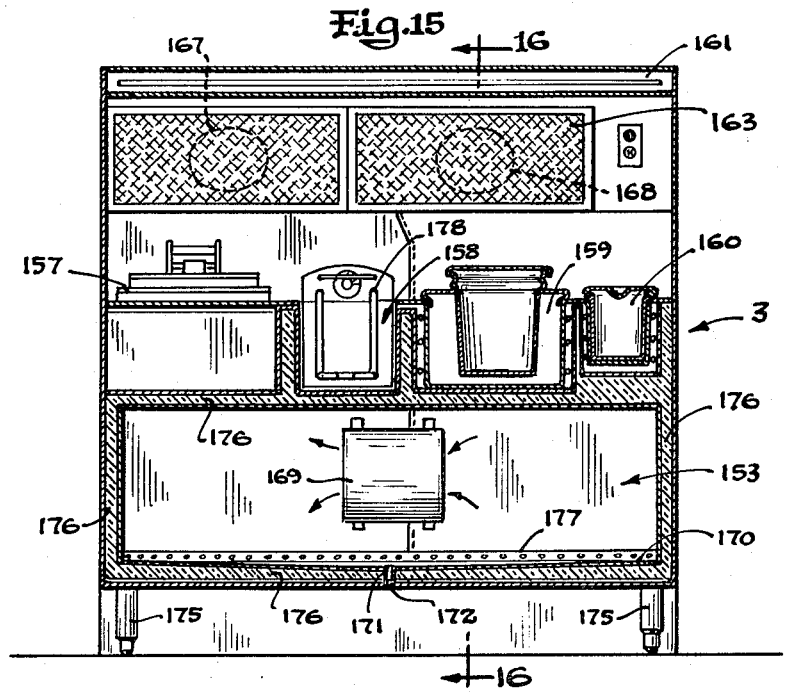
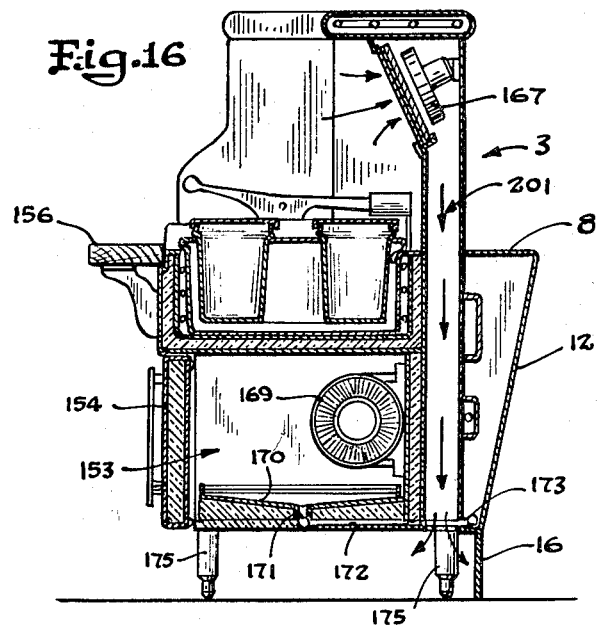
INVENTOR:
OTTO E. WERNER
BY
ATTYS Feb. 23, 1965  O. E. WERNER  3,170,541

FOOD VENDING ASSEMBLY

Filed Dec. 18, 1961  9 Sheets-Sheet 8

INVENTOR:
OTTO E. WERNER
BY
ATT'YS.

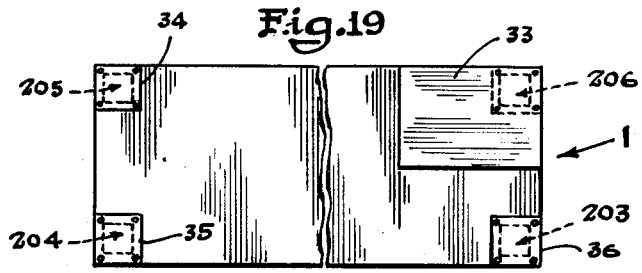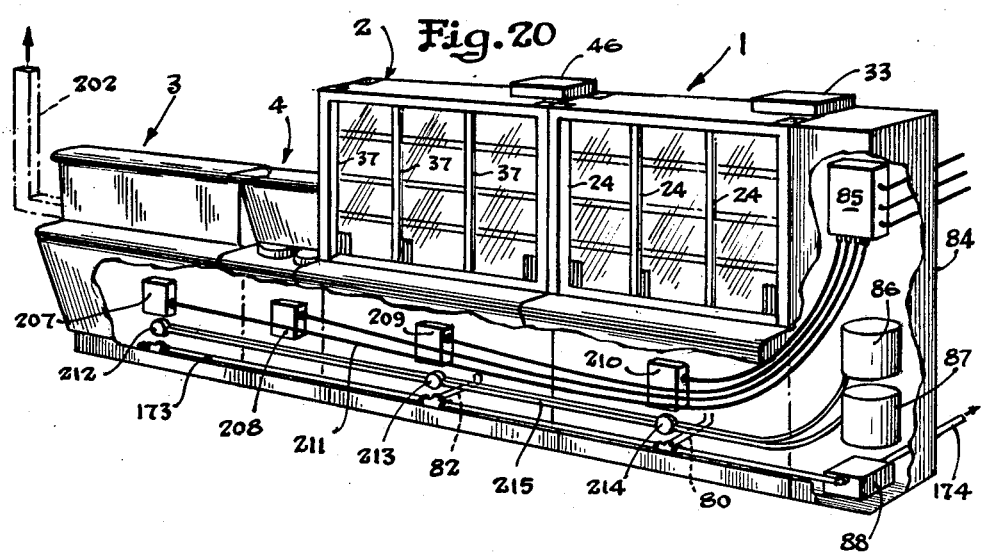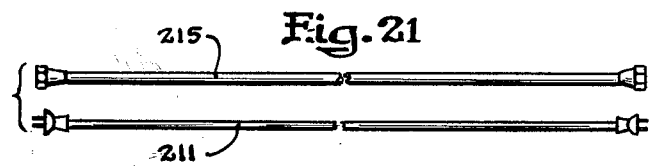

United States Patent Office 3,170,541
Patented Feb. 23, 1965

3,170,541
FOOD VENDING ASSEMBLY
Otto E. Werner, Skokie, Ill., assignor to Automatic Canteen Company of America, Chicago, Ill., a corporation of Delaware
Filed Dec. 18, 1961, Ser. No. 159,983
1 Claim. (Cl. 186—1)

This invention relates to a food vending assembly and more particularly to a food vending assembly comprising in combination a cold prepared food vending unit, a hot prepared food vending unit and a hot food preparation unit. The food vending assembly preferably also contains a change-making unit.

One of the objects of the invention is to provide a new and improved food vending assembly consisting of a plurality of units which are in contact from end to end and have a laterally projecting portion integral with each unit at an intermediate height providing a continuous counter in the front of the assembly.

Another object of the invention is to provide a food vending assembly comprising a plurality of units which are in contact from end to end and have a laterally projecting portion integral with each unit at an intermediate height providing a continuous counter in the front of the assembly characterized by the fact that the space below said counter is enclosed and various operating mechanisms for said units are mounted in said space, including electrical means for operating said units, conduit means for a refrigerant for cooling predetermined areas of said units, and liquid conduit means for removing condensed moisture from said units.

A further object of the invention is to provide a food vending assembly of the type previously described in which operating mechanisms running through the enclosed space beneath the counters of the respective units communicate at one end with an enclosed space formed by a housing and containing an electrical control box, cooling unit compressors and a sump pump.

A more specific object of the invention is to provide a new cold prepared food vending unit which permits the customer to make his own choice of cold foods, such as milk, cold sandwiches and desserts.

Another object is to provide a new and improved hot prepared food vending unit which permits a customer to select a previously prepared hot food.

An additional object of the invention is to provide a new and improved hot food preparation unit which is adapted to be associated with the other units previously described and wherein foods can be prepared to order while the customer waits.

Another specific object of the invention is to provide a food vending assembly of the type described in which the food vending units are associated with a cashier's unit for payment by the customer and making change.

Other objects and advantages of the invention will appear from the following description in conjunction with the following drawings in which FIGURE 1 is a perspective view of the front of a food vending assembly illustrating the best mode contemplated for the practice of the invention;

FIGURE 2 is a perspective view on a reduced scale of the rear of the food vending assembly shown in FIGURE 1;

FIGURE 5 is a vertical section from front to rear of a portion of the food vending assembly shown in FIGURE 1 taken along the line 5–5 of FIGURE 1;

FIGURE 6 is a vertical section from front to rear of another portion of the food vending assembly shown in FIGURE 1 taken along the line 6–6 of FIGURE 1;

FIGURE 7 is an elevational view of the food vending assembly shown in FIGURE 1 looking at the front thereof and additionally showing a housing at one end of the food vending assembly for various operating mechanisms;

FIGURE 8 is a schematic showing of interior parts of the cold prepared food unit illustrated in FIGURES 3, 4 and 6;

FIGURE 9 is a schematic showing of interior parts of the hot prepared food unit shown in FIGURES 3, 4 and 5;

FIGURE 10 is a wiring diagram of the hot prepared food unit shown in FIGURES 3, 4 and 5;

FIGURE 11 is a wiring diagram of the cold prepared food unit show in FIGURES 3, 4 and 5;

FIGURE 12 is a perspective view of the rear of the hot food preparation unit of the food vending assembly;

FIGURE 13 is a schematic view of operating parts of the food preparation unit shown in FIGURE 12;

FIGURE 14 is a perspective view of filters used in the food preparation unit shown in FIGURES 12 and 13;

FIGURE 15 is a vertical sectional view taken along line 15–15 of FIGURE 12;

FIGURE 16 is a vertical sectional view taken along line 16–16 of FIGURE 12;

FIGURE 19 is a plan view with parts broken away and in an enlarged scale of the top of one of the units shown in FIGURE 1;

FIGURE 20 is a perspective view with parts broken away of the front of the food vending assembly shown in FIGURE 1 illustrating the maner in which various operating means are connected; and FIGURE 21 is an enlarged detail view with parts broken away of refrigerant conduits and electrical cords, respectively, employed in the connections shown in FIGURE 20.

Figure 3:
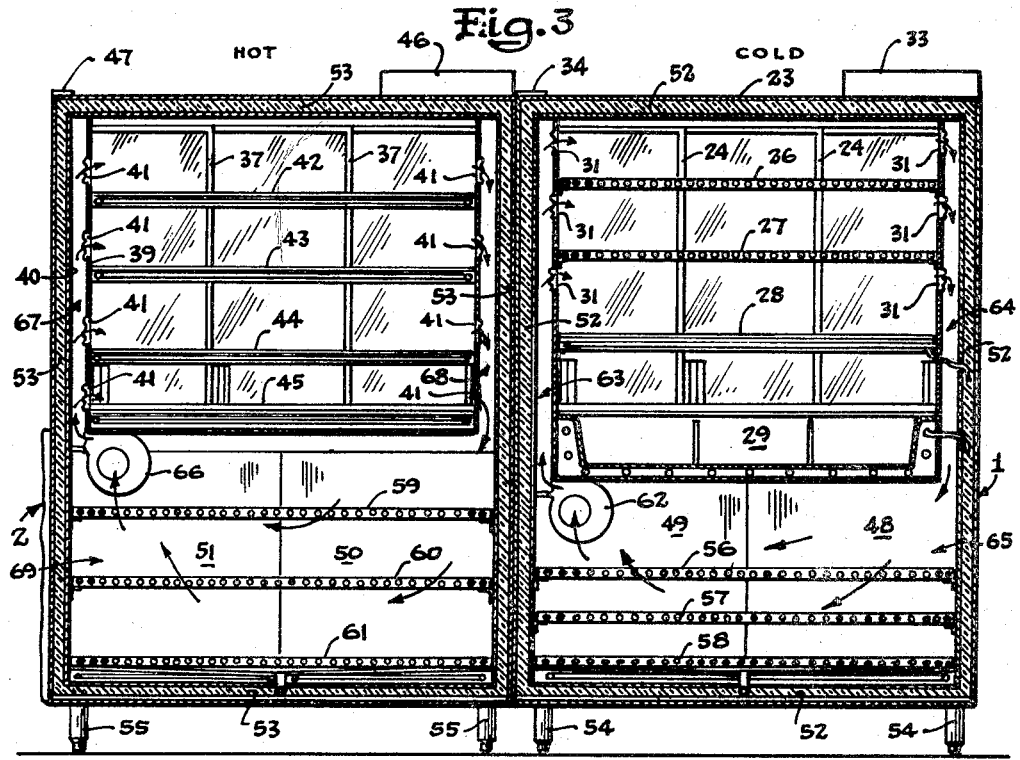
FIGURE 3 is a vertical section of a portion of the food vending assembly shown in FIGURE 1 taken along the line 3–3 of FIGURE 1.
Figure 4:
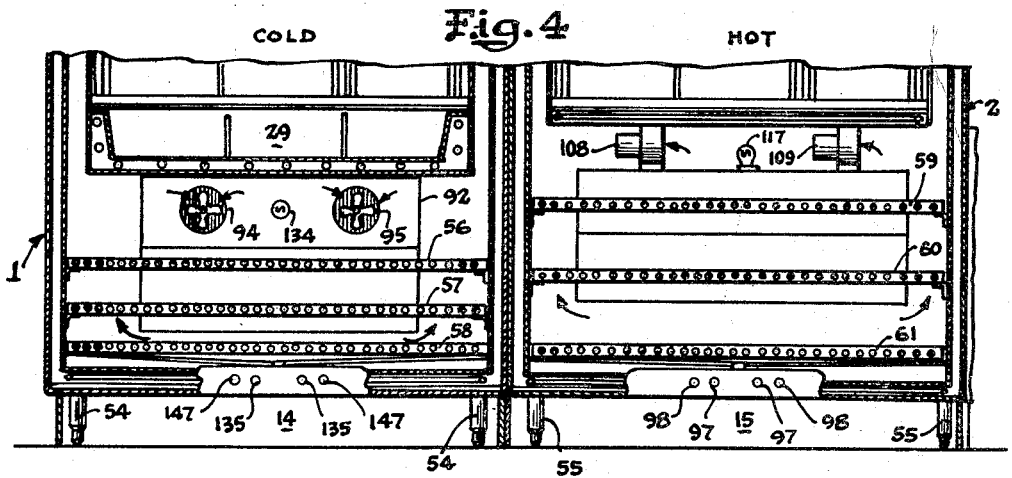
FIGURE 4 is a vertical section of another portion of the food vending assembly shown in FIGURE 1 with parts broken away taken along the line 4–4 of FIGURE 1.

As shown in FIGURES 1 and 2 the food vending assembly of the present invention comprises in combination a cold prepared food vending unit 1, a hot prepared food vending unit 2, and a hot food preparation unit 3. The food vending assembly also preferably has a change-making unit or cashier's unit 4.

Each of the units, 1, 2, 3 and 4 has a front counter 6, 7, 8 and 9, respectively. This counter projects laterally at an intermediate height, is integral with each unit and provides a continuous counter in the front of the assembly. The counter in each unit is enclosed by front panels 10, 11, 12, and 13, respectively. These panels slant downwardly and rearwardly to a vertical base 14, 15, 16 and 17, respectively, in each unit. The end unit 1 is provided with an end panel 18 beneath the counter portion and an end vertical base 19 beneath the end panel 18. Corresponding end panels are provided on the opposite end of unit 1 and on both ends of unit 2. Unit 3 is also provided with end panels generally shown at 20 and 21. Unit 4 is also provided with end panels so that this unit is self-supporting and can be used separately. However, the specific structure of this unit is not being claimed as a part of this invention.

The cold prepared food vending unit 1 which will be hereinafter referred to as the "cold unit" has a superstructure consisting of end panels 22, a top panel 23, front sliding doors 24 and rear sliding doors 25. Thus, the customers have ready access to food contained in the cold unit 1 merely by moving the doors 24 to the open position and the compartments and shelves in the unit 1 can be replenished by the operator by removing the sliding doors 25.

The cold unit preferably has two shelves 26 and 27 which are maintained at a temperature of about 40° F. by circulating a refrigerant through coils in the shelves. A third shelf 28 is preferably maintained at a temperature of 25° F. and a cold well 29 is preferably maintained at a temperature of 0° F.

Each of the ends of the cold unit 1 is provided with an inner panel 30 which is spaced from its associated outer end panel 22 and grilles or screens 31 are provided between the shelves 28 and 27, 27 and 26 and above the shelf 26 on opposite sides of the unit whereby air can be circulated over the food carried by these shelves, the circulating air being introduced into the space between the inner panel 30 and the outer panel 22 from a point beneath said space. It will be observed that the lower shelf 28 is solid so that the circulating air cannot pass into the cold well 29. The shelves 26 and 27 are also preferably solid but are provided with fins 32 which assist in maintaining proper cooling. These fins may be positioned either on top or below the shelves 26 and 27 or both. They are preferably spaced about 1 to 2 inches apart but this is subject to variation.

A control box 33 is mounted on the top 23 of the cold unit and removable plates 34, 35 and 36 are provided above each corner part of the unit to permit access thereto. Each corner part of the unit to which access is thereby provided consists of an enclosed rectangular column formed from sheet metal or other suitable material and provides a space for electrical connections, conduits, and the like.

The shelves 26 and 27 in the cold unit preferably slant upwardly from front to rear so that the food displayed thereon is clearly visible.

The hot prepared food vending unit 2, hereinafter called the "hot unit," is similar to the cold unit 1 in that it contains sliding doors 37 in the front thereof and sliding doors 38 in the rear thereof so that it is accessible to the customer from the front and the food therein may be replenished from the rear. This unit, like the cold unit is provided with inner panels 39 at opposite ends which are spaced from other panels 40, the latter being a part of the outer end walls of the hot unit. Screens or grilles 41 are provided which communicate with the space between the end panels and permit air to be circulated over the food on the shelves 42, 43, 44 and 45. Each of these shelves is preferably provided with a heating coil and the air temperature above each of the shelves is preferably maintained at about 160° F.

The hot unit 2 has a control box 46 and removable top plates 47 which provide access to an enclosed corner area where electrical wires and conduits are located.

The rear of the under part of the cold unit 1 is provided with doors 48 and 49 and the rear of the under part of the hot unit 2 is provided with doors 50 and 51.

As shown in FIGURE 3, the cold unit 1 is provided with insulation consisting of glass wool, or other suitable insulating material 52 on the sides, top and bottom and the hot unit 2 is provided with similar insulation 53 on the sides, top and bottom. The unit 1 is supported by legs 54 and the unit 2 is supported by legs 55.

The lower part of the cold unit 1 is provided with shelves 56, 57 and 58. The lower part of the hot unit 2 is provided with shelves 59, 60 and 61.

In the cold unit 1 a fan or blower 62 is provided which circulates air through the space 63, thence through the grilles or screens 31 over shelves 26, 27 and 28 and back through the space 64 to the lower part of the unit 65. In the hot unit 2 a fan or blower 66 circulates warm air through the space 67 and the grilles 41 above the shelves 42, 43, 44 and 45 into the space 68 and then back into the lower part 69.

The shelves 56, 57 and 58 in the lower part of the cold unit 1 consist of rods or wires which permit the circulation of air. The same is true of the shelves 59, 60 and 61 in the hot unit 2.

As can best be seen from FIGURES 5 and 6, the doors 48 and 49 on the cold unit and the doors 50 and 51 on the hot unit are provided with insulation 70 and 71, respectively. The cold well 29 on the cold unit is also insulated by means of insulation 72. Similarly, insulation 73 is provided above the lower cabinet portion of the hot unit 2.

The lower part of the cold unit 1 is provided with a shallow funnel-shaped structure 74 formed from sheet metal or other suitable material which serves to collect moisture and direct it toward a drain 75 which is connected to a conduit 76. In a similar manner the lower part of the hot unit 2 is provided with a shallow funnel-shaped structure 77 which serves to collect moisture and direct it toward a drain 78 which is connected to a conduit 79. The moisture passing through conduit 76 drains outwardly into another conduit 80 which is disposed in the space 81. The conduit 80 is connected to a suitable means for removing the collected moisture as hereinafter described. Similarly, moisture passing through conduit 79 drains outwardly to a conduit 82 in the space 83 of the hot unit 2. Conduit 82 is likewise connected to suitable means for removing the collected moisture as hereinafter described. Since these units are placed end to end in the food vending assembly, the conduits 80 and 82 are connected to each other. The space 81 is a continuation of the space 83 in this assembly.

FIGURE 7 illustrates the temperatures preferably maintained in the various units of the food vending unit assembly and also shows a preferred embodiment of the invention wherein a housing 84 is provided at one end of the assembly to house an electrical control box 85, two refrigerant compressors 86 and 87, and a sump 88 containing a sump pump to remove collected moisture.

FIGURE 8 illustrates schematically refrigerating apparatus used in the cold unit 1. As shown, this apparatus consists of a set of cooling coils 89 for the cold well 29 which are connected directly to a compressor and two additional sets of cooling coils 90 and 91. The cooling coils 90 are positioned in the shelf 28 and the cooling coils 91 are placed in a housing 92 in the front of the under part 65 of cold until 1. Another set of cooling coils 93 is optional and may be used, together with the cooling coils 91, in the under part 65 of the cold until 1 or in lieu of the cooling coils 91. Fans 94 and 95 are provided to assist in circulating the cold air which is also circulated by the blower 62. The cooling coils 90, 91 and 93 are connected to a suitable refrigerant compressor by conduits 96. Electric switch buttons 97 and 98 are provided in a panel 99 in contact with doors 48 and 49 and are so connected electrically as to break the blower circuit when either or both doors are opened, and to make contact in a light circuit. Thus, when one or both doors 48 and 49 are opened air circulation is temporarily halted.

FIGURE 9 illustrates the heating circuits for the hot unit 2. It will be seen that the shelves 42, 43, 44 and 45 have embodied therein heating elements 100, 101, 102 and 103, respectively. These heating elements are connected by wires 104 and 105 to a suitable source of electricity. In the under part of the hot unit 2 additional heating elements are provided at 106 and 107. Either or both of these elements may be used. Blowers 108 and 109 are provided to assist in circulating the warm air. Blower 66 also assists in this circulation, particularly in causing the warm air to be passed through the space 67 and the grilles 41 over the shelves 42, 43, 44 and 45 and thence back through the passageway 68 to the under part 69 of the hot unit 2. The heating elements 106 and 107 are connected to wires 109 and 110 which in turn are connected to a suitable source of electricity. FIGURE 9 also contains two switches 135 and two switches 147 mounted on a panel 230 positioned to be actuated by doors 50 and 51.

As shown by the wiring circuit in FIGURE 10 a 110-220 volt 30 ampere single phase current carried by wires 111, 112 and 113 operates the heating elements 100, 101, 102, 103, 106 and 107. A thermostatic switch 114 is provided to close the circuit to the heating units 106 and 107 when the temperature drops below 160° F. and thermostatic switches 115 and 116 are provided to open the circuit when the temperature reaches 190° F. Each of these last-mentioned thermostats 115 and 116 may be disposed adjacent a separate heater to sense the temperature of the respective heater, for example, thermostat 115 may be adjacent heater 106 and thermostat 116 adjacent heater 107. The door switches 135 close a circuit through the light 117 when the doors 50 and/or 51 are opened. A manual toggle switch 118 and an on-light 119 are provided in order to manually control the operation of the heater circuit through the heating units 100, 101, 102 and 103. Similarly a manual toggle switch 120 and an on-light 121 are provided to manually control the circuit through the heaters 106 and 107, including the fans 108 and 109. The door switches 147, 147 are normally closed through the circuit of fan 66 when the doors are closed and they are opened thereby stopping the fan 66, when the doors 50 and/or 51 are opened. A switch 122 is provided to manually control the operation of the fan 66, together with an on-light 123. Suitable fluorescent lights, the positions of which are not shown physically herein, may be applied where necessary to illuminate the front or customer side of the assembly and food items contained in cold unit 1 and hot unit 2 of these fluoroescent lights 124 are provided with the usual circuits including a starter 125 and a ballast 126 are manually controlled by a toggle switch 127. The circuit breaker 128 and the fuse 129 are provided as safety precautions.

As shown in FIGURE 11 the cold unit 1 is operated by electricity from a suitable source, for example, 115 volts and 30 amperes delivered through wires 130 and 131. The refrigerant is compressed by means of remote compressors 86 and 87 which can be manually started by switches 132 and 133. A service light 134 is operated by push button switches 98 when either of the doors 48 and 49 is opened. A manually operating switch 136 and an associated on-light 137 are provided to control the compressor 87 so that, if necessary, only one compressor can be operated. The evaporator fans 94 and 95 are controlled through a toggle switch 138 provided with an on-light 139. This switch also controls a resistance heater 140 used for defrosting.

The temperature in the cold well 29 is controlled by means of a thermostatic switch 141 which controls the flow of electricity through a solenoid 142 which in turn controls a valve in the refrigerant line. A single pole, double throw switch 143 is normally closed through the thermostatic switch 141. This circuit is opened by closing switch 143 through a circuit containing a cold well defroster light 144. Fluorescent lights 145 are in a circuit controlled by toggle switch 146. Circulating fan 62 is in a circuit which is opened by door switches 97 so that the fan 62 stops when either of the doors 48 or 49 is opened. A manually operated switch 148 controls the circuit through fan or blower 62 and is associated with an on-light 149. A fuse 150 and a circuit breaker 151, 152 are provided as precautionary measures.

The food preparation unit 3 is shown in detail in FIGURES 12 to 16. This unit comprises a lower storage area generally indicated at 153 to which access is obtained through doors 154 and 155, the counter 156, a grille 157, a deep fry well 158, a food heating unit 159, and a food heating unit 160. The warming counter 161 is provided in the upper part of the unit 3. Associated with the warming counter 161 and extending over the grill and deep fry units is a hood 162. A plurality of removable filters 163 are positioned so as to slant forwardly and downwardly from beneath the warming counter 161. These filters preferably contain at least one filter 164 adapted to catch grease and two charcoal-type filters 165 and 166 as shown in FIGURE 14. As illustrated, there are preferably two sets of three filters each and behind these filters are exhaust fans 167 and 168. A refrigerant evaporator 169 is provided in the storage space 153.

As will be seen from FIGURES 15 and 16 the bottom 170 of the compartment 153 has a shallow funnel-shaped structure permitting water to flow to a central conduit 171 which connects with a conduit 172, the latter in turn connecting with a drain pipe 173 as shown in FIGURE 20, whereby any condensate from the compartment 153 is transmitted to the sump 88 where it is removed by a sump pump through conduit 174. In a like manner drains from the hot unit 2 and the cold unit 1 are connected to conduit 173. An optional arrangement which can be used when a hot preparation unit is not a part of the food vending assembly is to disconnect the conduit 172 and permit condensate to drain directly from conduit 171 into a suitable receptacle, not shown. The food preparation unit is supported by legs 175 and the storage area 153 is insulated by suitable insulation 176. A storage shelf 177 is also provided. The grill 157 is heated in a conventional manner. The deep fry well 158 is heated by means of a Calrod unit 178, and conventional heating units are used to heat the food heating units 159 and 160.

Figure 17:
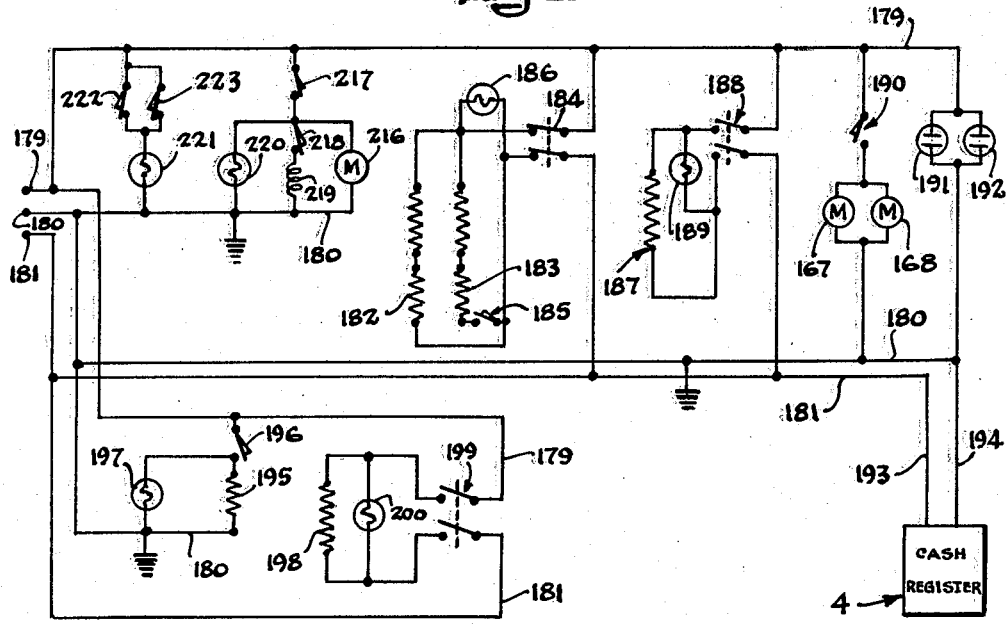
FIGURE 17 is a wiring diagram of the food preparation unit shown in FIGURES 12, 13, 15 and 16.

As shown by the wiring diagram in FIGURE 17, the food preparation unit 3 is electrically operated from a suitable source of electricity, for example, 220 volts and 30 amperes connected to wires 179 and 181. The wires 179 and 180 form a 110 volt circuit. The same is true of the wires 180 and 181. The wires 179 and 181 are connected through electrical circuits to a bottom grid 182 and a top grid 183 of the grill 157, controlled by a thermostatic switch 184. The top grid is independently controlled by an on-and-off switch 185 in a circuit containing a signal light 186. The food warmer or food heating unit circuit is shown at 187 and this controls the heat to the food warming units 159 and 160. This circuit is controlled by a thermostatic switch 188 and the circuit also contains a signal light 189 which is on when the switch is closed. The exhaust blowers 167 and 168 are controlled by a toggle switch 190. Two outlets 191 and 192 are provided as a convenience. Lines 193 and 194 operate a cash register in the cashier's unit 4. The hot shelf or counter 161 is heated by a heating unit 195 controlled by a toggle switch 196 and having an on-light 197. The deep fry unit is heated by a heating element 178 controlled by a thermostatic switch 199 and the circuit contains an on-light 200.

Figure 18:
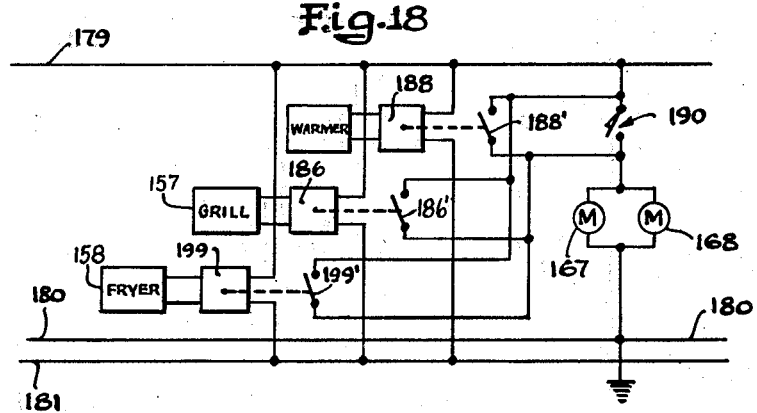
FIGURE 18 is a wiring diagram of the exhaust system of the food preparation unit shown in FIGURES 12 to 16.

The modification of the wiring diagram is shown in FIGURE 18 in which the exhaust fans 167 and 168 are controlled automatically and are actuated in response to the actuation of any one of the heating means, that is, the grill 157, the deep fry unit 158, or the warming units 159 and 160. In this modification switches 186, 188 and 199 are thermostatically actuated but have associated manually operable means for turning them on and off. The switches 186' 188' and 199' are ordinary on-and-off toggle switches actuated in unison with the manually operable means for turning the thermostatic switches on and off. Thus, the exhaust fans 167 and 168 are operated or turned off when either the fryer, grill or warmer are operated or turned off. On the other hand, the exhaust fans 167 and 168 can continue to operate even though the thermostatic switches open and close periodically in order to maintain a predetermined temperature in any of the heating means.

As shown in FIGURE 16 the food preparation unit 3 has an exhaust passageway 201 behind the heating means which communicates with the exhaust fan 167 and the filtering means. This passageway can open onto the floor as shown in FIGURE 16 or it can be closed at the lower end and be connected with an exhaust pipe 202 leading to the outside or to a chimney, or the like, as shown in FIGURE 20.

From the foregoing description it will be seen that the invention provides a food preparation unit wherein food is prepared by heating it and which comprises the combination of a heating means and exhaust means in which gases and vapors are removed from the heated foods, said exhaust means comprising filtering means mounted obliquely behind and partially above said heating means, exhaust fans mounted behind said filtering means, and means providing a passageway communicating with said exhaust fans to permit removal of exhausted gases and vapors. The filtering means as shown are preferably rectangular in shape and substantially coextensive in area with the heating area. They are also preferably substantially coextensive in area with the area of the vessels in which food is being heated or cooked. However, this is subject to some variation and it is possible to use a smaller or larger filtering area.

FIGURE 19 illustrates on an enlarged scale the top of unit 1 showing the covering plates 34, 35 and 36 and also the control box 33. The covering plates 34, 35 and 36 are fastened by means of screws or other suitable means and are readily removable so that wires and conduits can be placed in the vertical passageways 203, 204 and 205. Another vertical passageway 206 is positioned beneath the control box 33. The structure of the top of unit 2 is substantially the same.

FIGURE 20 illustrates the manner in which the units 1, 2, 3 and 4 are assembled end to end and connected together. These units are provided with junction boxes 207, 208, 209 and 210 which are readily connected by means of electrical connections such as the connection 211 shown in FIGURE 21. Similarly the units 1, 2 and 3 are provided with connecting means 212, 213 and 214 whereby refrigerant conduits such as conduit 215 in FIGURE 21 can be connnected to remote compressors 86 and 87. In a like manner conduits 80 and 82 of units 1 and 2 are connected to a conduit for liquids whereby condensate from these units and also from unit 3, can be carried to the sump 88, from which the condensate is removed by a suitable sump pump, not shown.

It will be seen that the invention provides a food vending assembly in which different units are assembled in contact end to end and have a laterally projecting portion integral with each unit at an intermediate height providing a continuous counter in the front of the assembly and an enclosed space below said counter containing electrical means, for operating said units, conduit means for a refrigerant for cooling predetermined areas of a plurality of said units, and liquid conduit means for removing condensed moisture from a plurality of said units. Furthermore, the arrangement described makes it possible to connect all of said units to remote cooling unit compressors, remote electrical control means, and a remote pump for removing liquid condensate.

It will be apparent that the invention is subject to some variation in the manner of its practical application. For example, in units 1 and 2 there is an understructure with a space therein for food storage and a superstructure mounted above said understructure with a space therein for display and vending of food. In both of these units means are provided for circulating air from one of said spaces through the other. In one of the units cooling means is provided and in the other heating means is provided. In both units means are provided for temporarily rendering said air circulating means inoperative in response to the opening of an access door to the food storage space. It will be apparent that similar means for temporarily rendering the air circulating means inoperative can be provided to operate in response to the opening of an access door to the display and vending space. This has the distinct advantage that air of a different temperature from the temperature of the air in the units is not drawn into the units by the air circulating means.

The manner in which the air is circulated makes it possible to locate the cold well 29 in unit 1 centrally with respect to the path of the circulating air but at the same time insulated therefrom. Since this unit is usually used for storing ice cream and similar frozen foods, it is advantageous to have it readily accessible at counter height.

In the food preparation unit 3, the use of refrigeration is desirable but optional. The refrigeration system is conventional. The evaporator 169 (FIGURES 13, 15 and 16) is connected to a suitable source of refrigerant, as previously described. The evaporator is provided with a blower 216 (FIGURE 17) connected in a circuit with wires 179 and 180 controlled by an on-off toggle switch 217. Temperature control is provided by a thermostatic control 218 which actuates a solenoid 219 of a suitable refrigerant line control valve. A signal light 220 is provided. A service light 221 is provided to illuminate the cabinet space 153 and is turned on by switches 222 and 223 in response to opening doors 154 and 155, respectively (see FIGURES 12 and 13).

It will also be noted that the grill 157 in the food preparation unit 3 has a grease removal spout 224 and the grease drops into a removable container 225 (see FIGURE 13). This is also an optional but preferred embodiment.

The invention is hereby claimed as follows:

A composite restaurant food service structure comprising a plurality of units alignable in abutment end-to-end and having an integral portion projecting laterally from each unit at an intermediate height to provide a continuous counter on a customer side of the structure for the transport of food items by the customer along said counter, at least one of said units comprising a closed display cabinet, a plurality of superposed shelves in said cabinet, each of said shelves visible and accessible from said customer side and from the opposite servicing side, a cashier's position unit adjacent said cabinet unit and a food preparation unit juxtaposed in said structure with the couter extending integrally past both said last-mentioned units, a co-terminous wall on each of said last-mentioned units extending upwardly from said counter to a height allowing prepared food items to be passed over said wall, a shelf at the top of said wall, said shelf heated at said preparation unit for retaining items in a heated condition while awaiting removal by a customer, said shelf and said wall transparent at said cashier's position, whereby food items removed by a customer from said display cabinet and food items removed from said preparation unit wall may be rested on the counter for visual evaluation by a cashier stationed on the servicing side of said assembly at said cashier's position.

References Cited by the Examiner

UNITED STATES PATENTS

| | | | |
|---|---|---|---|
| Re. 22,228 | 12/42 | Peterson | 126—299 |
| 469,010 | 2/92 | Duhm | 312—236 X |
| 1,137,752 | 5/15 | Goldstein | 131—135 X |
| 1,800,863 | 4/31 | Johnson | 312—236 X |
| 1,943,575 | 1/34 | Abendroth | 119—37 |
| 2,188,586 | 1/40 | Wirtz | 312—281 X |
| 2,248,867 | 7/41 | Hallman | 219—35.6 |
| 2,285,218 | 6/42 | Meyers | 312—130 |
| 2,298,790 | 10/42 | Klassen | 312—223 X |
| 2,392,038 | 1/46 | Gaylord | 126—299 |
| 2,432,397 | 12/47 | Earle | 312—236 X |
| 2,458,190 | 1/49 | Newburger | 219—19.17 |
| 2,463,614 | 3/49 | Hardin | 312—116 X |
| 2,476,896 | 7/49 | Myhre | 312—223 X |
| 2,485,880 | 10/49 | Hawkins | 219—19.17 |
| 2,542,136 | 2/51 | Hanson. | |
| 2,569,934 | 10/51 | Kurtzon | 312—140 X |
| 2,627,445 | 2/53 | Lyon | 312—236 X |
| 2,825,615 | 3/58 | Zimmerla | 312—223 X |
| 2,894,604 | 7/59 | McMillan | 312—140.1 X |

FOREIGN PATENTS

| | | |
|---|---|---|
| 227,112 | 8/58 | Australia. |
| 914,013 | 1/56 | Germany. |
| 682,231 | 11/52 | Great Britain. |
| 843,226 | 8/60 | Great Britain. |

OTHER REFERENCES

Leitner Precedent Series of Food Service Equipment, published March 1959, Leitner Equipment Co.

FRANK B. SHERRY, *Primary Examiner.*